UNITED STATES PATENT OFFICE.

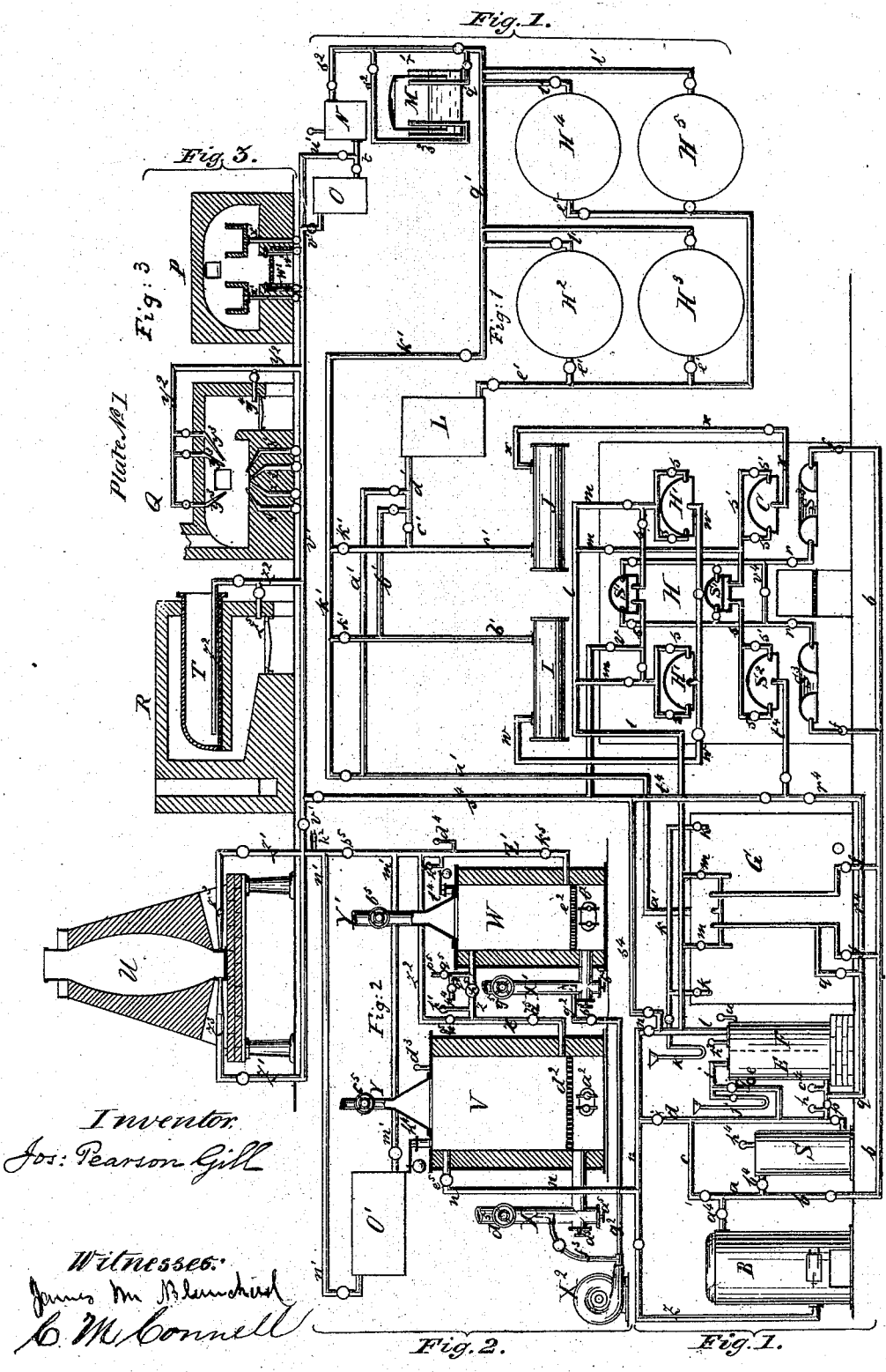

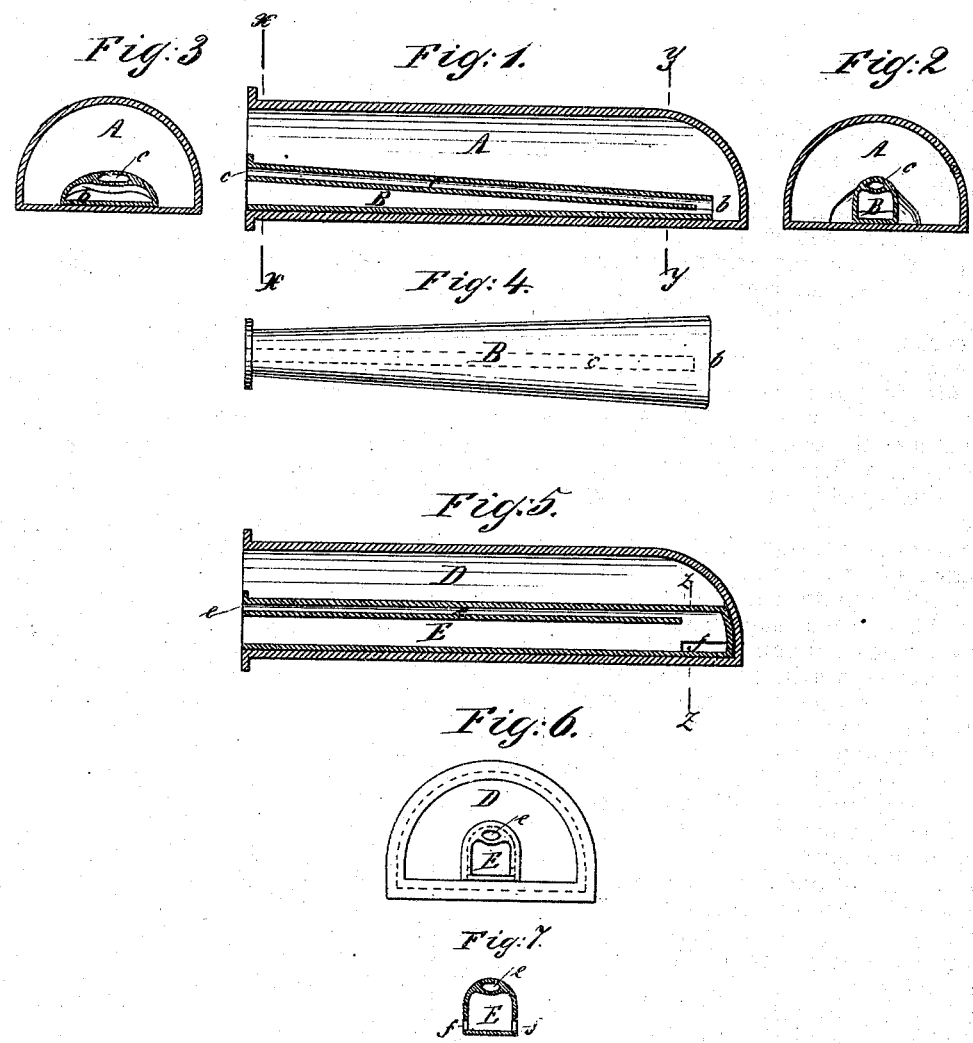

JOSEPH PEARSON GILL, OF NEWARK, NEW JERSEY.

IMPROVEMENT IN TREATMENT OF MINERALS AND METALS.

Specification forming part of Letters Patent No. 182,457, dated September 19, 1876; application filed September 12, 1876.

*To all whom it may concern:*

Be it known that I, JOSEPH PEARSON GILL, of the city of Newark, county of Essex and State of New Jersey, have invented certain new and useful Improvements in the Treatment of Minerals and Metals, in the sponging and reduction of ores, in the manufacture of metals of all kinds, and in the treatment of iron and steel manufactures, by the use of hydrogen, carbonic-oxide and carbonic-acid gases, carbureted hydrogen gas, and hydrocarbon vapors, superheated steam, and atmospheric air, in the combinations hereinafter specified; and I do hereby declare that the following is a full, clear, and exact description thereof, which will enable others skilled in the art to which it pertains to understand and use the same.

My invention consists, first, in the direct application of hydrogen gas, either pure or with a small admixture of carbonic-oxide gas, air, either hot or cold, superheated steam, hydrocarbon gases and vapors, and carbonic-oxide and carbonic-acid gases, as hereinafter specified, to the ores of metals, to minerals, to the manufacture of metals, to metals in the process of manufacture, and to manufactures of metals; second, in the direct application of the decomposition of superheated steam and hydrocarbon vapors to minerals, ores, and metals, as hereinafter specified; third, in the general treatment and manufacture of minerals, ores, and metals, as hereinafter specified, by the use of gases, superheated steam, and hydrocarbon vapors, manufactured under processes and by apparatus described in United States Patents Nos. 171,117, 179,474, and 179,-475, and in my application filed by me August 21, 1876, the said gases being delivered from the gas-storing and gas-making apparatus by means of a regulator, as in Patent 179,475, or by the gas-making apparatus, shown in Plates 1 and 2 of the annexed drawing, which is hereby made part of this specification.

I do not here restrict myself to the forms of apparatus therein designated, but may use other analogous forms suitable for substantially the same treatment of minerals, ores, and metals.

The principle governing the use of the different agents employed by me, and described in the several patents and application above mentioned, is applicable alike to the treatment of the different substances and for the different purposes therein specified, and to those hereinafter designated, the variation in the results produced being due to the special application of the general principle.

The hydrogen gas employed by me is the gas chemically known as hydrogen, and is used in a pure or nearly pure state, or with a small admixture of carbonic-oxide gas, except as otherwise specified, it being purified by the means employed and described by me herein.

I use the hydrogen gas, carbureted-hydrogen gas, hydrocarbon vapor, superheated steam, carbonic-oxide gas, carbonic-acid gas, and air, either hot or cold, in the combinations hereinafter specified.

I treat the various articles in the various processes named in open furnaces, in which air or the products of combustion are admitted, as blast, reverberatory, and other furnaces; in an apparatus or furnace in which air is not admitted to the substances under treatment, as in a converter for the manufacture of molten steel; or in which air is admitted only in quantity sufficient for the combustion of the fuel, as in a reverberatory or reheating furnace; or in closed vessels or chambers from which atmospheric air is excluded, such as annealing and reheating furnaces, retorts, vessels for coating wrought-iron with surfaces of steel, for converting wrought-iron into steel, for treating the surfaces of iron castings, &c. The different descriptions of the furnaces, and other apparatus used in each case, I adapt to the specific treatment the several articles require.

I also treat metal in its various conditions by a properly-regulated use of carbonic-oxide gas, which, by imparting its carbon to the metal or withdrawing oxygen from it, is converted into carbonic-acid gas; and also by a similar use of carbonic-acid gas, which, by withdrawing carbon from the metal or imparting oxygen to it, is converted into carbonic-oxide gas, either of these different effects being under the control of an operator skilled in the art.

In the reduction of ores, such as the oxides and carbonates of iron, in the cupola or blast furnace, I have already described an application of my process, in United States Patent 179,475, to the oxides of iron. As an improvement to the application of the process therein described, I use the following method of treatment: The furnace being filled with alternate layers of ore and lime, and heated to the proper degree of temperature by the combustion of the hydrogen, I admit the hydrogen in excess, which combines with the oxygen of the ore, forming water, which escapes. It also combines with sulphur, phosphorus, and other impurities, as before described, and the ore is reduced to a sponge. I also admit carbonic-oxide gas, to assist in the reduction of the ore. In order to supply the ore, when reduced as above, with sufficient carbon to enable it to melt and run freely, I introduce into the furnace carbureted-hydrogen gas or hydrocarbon vapors in regulated quantities, to give the proper degree of fluidity to the iron without overcharging it with carbon. Or, when required, I introduce a larger proportion of hydrocarbon, in order to supply the necessary percentage of carbon to the iron to convert it into steel or cast-iron.

When the ores of the carbonates of iron are reduced in said furnaces, I use hydrogen gas as the purifying agent to remove the carbonic acid from the ore, as well as other impurities which may be present, as sulphur, &c., the hydrogen uniting with the carbon to form a carbureted-hydrogen gas, which is consumed in the furnace. I employ superheated steam, atmospheric air, or carbonic-acid gas alternately, or in conjunction with the hydrogen gas, at such times as they are preferably used to assist in the reduction of the ore, and also carbonic oxide or a hydrocarbon, to assist in maintaining or regulating the degree of carbon in the metal as it is being reduced.

When the furnace has been filled with alternate layers of ore and lime, after the usual manner, and brought to the proper degree of heat by the combustion of the hydrogen, which I admit through the usual tuyeres, the hydrogen, being in excess, combines with the carbon, and a reduction of the ore takes place. I also admit the hydrogen through tuyeres, which enter the top and sides of the furnace below the reducing-zone. I admit superheated steam in regulated quantities, when the ore is in a proper condition to receive it, through the lower or upper tuyeres, as may be required, to assist in maintaining the temperature, and also to assist in the reduction of the ore by the decomposition of the steam, the oxygen of the steam uniting with the carbon of the ore, forming carbonic-acid gas, which is expelled from the furnace. I also admit heated atmospheric air or carbonic-acid gas through the tuyeres, in regulated proportions, at the earlier stage of the process, to assist in the reduction of the ore by the combination of the oxygen with the carbon.

If too much carbon is removed from the ore to enable it to melt and run freely from the furnace, I introduce through the lower tuyeres carbonic-oxide or a hydrocarbon gas or vapor in quantity sufficient to carburet the iron, to give it the proper degree of fluidity with the ordinary temperature of a blast-furnace. By this method I produce a very pure quality of iron from a blast-furnace.

When cast-iron or steel is desired, I produce it by introducing through the lower tuyeres of the blast-furnace a hydrocarbon gas or vapor in sufficient quantity to impart to the iron the percentage of carbon required.

In order to produce the iron from the ore without the melting process of the blast-furnace, I place the ore in a vessel similar to that specified by T in furnace R, Fig 3, Plate 1, in the annexed drawing, or in any vessel or retort corresponding thereto, from which the products of combustion are excluded, and which is heated by external heat. I admit into said vessel, through suitable pipes or tuyeres, a current of hydrogen gas. If the ore is an oxide of iron, the hydrogen unites with the oxygen, forming water, which is expelled. To assist in this sponging of the ore by the deoxidation of it, I admit in regulated proportions carbonic-oxide gas by means of a suitable pipe or tuyere. By this method of treatment I obtain a very pure sponge; and when I desire to convert it into cast-iron or steel, I introduce, through pipes or tuyeres, hydrocarbon gas or vapors in sufficient quantity to impart to the iron the percentage of carbon required. If the ore is a carbonate of iron, the hydrogen unites with the carbon to form a carbureted-hydrogen gas, which is expelled. To assist in the sponging of this ore by the decarburation of it, I admit superheated steam, in regulated quantities, when the ore is in a proper condition to receive it, by means of suitable pipes or tuyeres, the oxygen of the steam uniting with the carbon of the iron to form carbonic oxide or acid gas, which passes off. I also admit heated atmospheric air or carbonic-acid gas at the earlier stage of the process, by means of suitable pipes or tuyeres, to assist in the sponging by the combination of the oxygen with the carbon. I thus produce a very pure iron sponge, which I also convert into a steel or cast-iron sponge, when required, by the use of hydrocarbon gas or vapors, as hereinbefore described. This sponge, when completed, I withdraw in a heated state, and treat it in one of the three ways indicated by the character of the sponge produced. When it is a wrought-iron, homogeneous, or steel sponge, I transfer it to a reverberatory or puddling furnace to prepare it for treatment under the hammer or in the rolls. I also transfer the steel sponge to suitable crucibles for smelting. The cast-iron sponge I transfer to cupola or blast furnaces for the manufacture of iron castings.

I also treat ores for their reduction into sponge in a similar manner to that described above in reverberatory or reheating furnaces, atmospheric air being admitted, by measure, in quantity only sufficient for the conversion of the fuel into carbonic-acid gas or watery vapor. In these furnaces I preferably use gas or hydrocarbon vapor for the fuel. In this process the products of combustion are comparatively harmless, and do not come in direct contact with the ore. The hydrogen or other gas or vapor, being applied directly to the ore, prevents the direct contact of the products of combustion, and their action in the sponging of the ore is analogous in principle and use to that hereinbefore described.

I also treat wrought-iron in heated retorts in an apparatus similar to that described in United States Patents Nos. 171,117, 179,474, and 179,475, and in bench H, Fig. 1, Plate 1 of the annexed drawing, during the process of the manufacture of heating and illuminating gases by the decomposition of highly superheated steam and hydrocarbon vapors, which I admit into said retorts in such a regulated manner as by their decomposition to produce hydrogen and carbonic-oxide gases, the iron being purified and converted into steel, semi-steel, or cast-iron by the action of the said steam and vapors.

I also treat wrought-iron to convert it into steel, homogeneous iron, cast-iron, or malleable cast-iron by the direct application of hydrocarbon vapors, carbureted-hydrogen gas, or carbonic-oxide gas in a closed vessel, box, or retort heated in a furnace, and from which atmospheric air is excluded, the gas or vapor being admitted into the said closed vessel or retort in regulated quantities by means of suitable pipes from an apparatus preferably similar to either of those described in United States Patents Nos. 171,117, 179,474, and 179,475, and in Plate 1 of the annexed drawing. This special treatment is applicable to the restoration of deteriorated iron by preparing it for further treatment in the refinery, cupola, or reverberatory furnace.

In the treatment of iron sponge, and also the iron from the blast-furnace in refining, reverberatory, and puddling furnaces, in addition to the direct application of hydrogen as a purifying agent, I use it for fuel, thus avoiding the introduction of carbon into the furnace; or I use a solid carbonaceous substance, such as coal, for fuel, but preferably a carbonaceous gas or vapor, air being admitted, by measure, only in the proportion to convert the carbon into carbonic-acid gas. I apply the hydrogen to the metal in the furnace by means of suitable tuyeres to remove the carbon and other impurities. I also, at a given time, introduce superheated steam and atmospheric air in limited regulated quantity to assist in the purification, avoiding the oxidation of the metal. When the iron is thoroughly puddled, I remove it, and place it under the hammer or in the rolls, in the usual manner, for the manufacture of wrought-iron bars and plates.

In the manufacture of armor-plates and boiler-plates of homogeneous iron, containing a small proportion of about one-quarter of one per cent. of carbon, I apply hydrocarbon gas and vapors in the steel converter to the molten iron. I also convert the prepared wrought-iron plates into steel or homogeneous iron, containing a greater or less percentage of carbon, and I also use hydrogen gas in the heating and rolling of the plates, whether of wrought-iron, homogeneous iron, or of steel. The several processes involved in this manufacture, having been previously described herein, do not need further description.

In order to obtain a sufficiently pure hydrogen gas for the treatment of minerals, ores, and metals, and manufactures of metals, by freeing it from the presence of carbonic-oxide gas, which is a product of the decomposition of water by carbon, I have devised the following apparatus: Any form of retort may be used. If a single horizontal retort is used, I place in it a smaller retort or conducting-chamber, as at B and E, Figs. 1 and 5, Plate 2.

The hydrogen and carbonic-oxide gases made in the chambers A and D, or in separate retorts, pass from A into B, through the opening $b$ at the rear end and at the bottom of B, or pass from D into E through the openings $f$ on the sides, and at the rear end and bottom of E, superheated steam being admitted at the same time through the passages $c$ and $e$, respectively. The chambers B and E are filled with incandescent mineral or metallic substances, by the combined action of which and of the superheated steam the carbonic-oxide is converted into carbonic-acid gas. The hydrogen and carbonic-acid gases pass from the chambers B and E through their front ends or openings, and the carbonic-acid gas is afterward removed, if so required, by lime or other alkaline purifying material, leaving a pure, or nearly pure, hydrogen gas, which is then directly applied to the treatment of minerals, ores, and metals, and the manufacture of metals, as hereinbefore described.

Referring to the annexed drawings, which are hereby made part of this specification, Plate 1, Figure 1, represents a portion of the gas and vapor producing apparatus, &c. The pipes specified all have valves to regulate their use or to disconnect, as indicated in the drawing. B indicates a boiler. S indicates a superheater. $a$ indicates a pipe leading from the boiler to the superheater S. $a^4$ indicates a safety-valve to B. $b^4$ indicates a valve on $a$. E F indicate a vaporizer. G indicates the bench of retorts, &c., vaporizers, and hydraulic main in Fig. 1 United States Patent No. 179,475. $b$ indicates a pipe leading from $a$ to superheaters $S^3$ in bench G, and also in bench H. $f$ indicates branch pipes from $b$ to superheaters $S^3$. H indicates a bench of retorts containing superheaters and retorts for making hydrogen gas, carbonic-oxide and carbonic-acid gases. $S^1$ $S^2$ $S^3$ indicate superheaters in bench H. $H^1$ indicates retorts for making hydrogen gas. C indicates retorts for making carbonic oxide and acid gases. I indicates the hydraulic main to retorts $H^1$. J indicates the hydraulic main to retorts C. $p$ indicates a pipe leading from superheater S to vaporizer E F. $h$ indicates a pyrometer on pipe $p$. $c^4$ indicates a pressure-gage on $p$. $h^3$ indicates a pyrometer on vaporizer. $u$ indicates a pressure-gage on vaporizer. $h^4$ indicates a pyrometer on superheater S. $d$ indicates a pipe leading from superheater S to pipe $n$. $e$ indicates a branch pipe from pipe $d$ to vaporizer E F. $g$ indicates a branch pipe from pipe $d$ to pipe $j$. $j$ indicates a siphon-pipe conducting hydrocarbon liquids from a tank to vaporizer E F. $k$ indicates a siphon-pipe conducting hydrocarbon liquids from a tank to vaporizers to bench G. $l$ indicates a pipe leading from vaporizer E F to benches G and H. $m$ indicates branch pipes from pipe $l$. $n$ indicates a pipe leading from pipe $l$ to cupola or retort V in Fig. 2. $z$ indicates a pipe leading from pipe $n$ to boiler B, to supply hydrocarbon vapors for fuel. $s^4$ indicates a pipe leading from pipe $n$ to pipe $v^1$, Fig. 3, which communicates with the furnaces, forges, &c. $t^4$ indicates a pipe leading from superheater $S^2$ in bench H to pipe $s^4$. $v$ indicates a pipe leading from superheater $S^1$ to $s^4$. $r^4$ indicates a pipe leading from pipe $t^4$ to pipe $q$. $q$ indicates a pipe leading from superheater in bench G to pipe $p$. $r$ indicates pipes leading from superheaters $S^3$ to superheaters $S^1$ in bench H. $v^4$ indicates a pipe connecting pipes $r$. $s$ indicates pipes leading from upper superheater $S^1$ to retorts $H^1$. $s^1$ indicates pipes leading from lower superheater $S^2$ to retorts S and C. $w$ indicates a pipe leading from retorts $H^1$ to hydraulic main I. $x$ indicates a pipe leading from retort C to hydraulic main J. $a^1$ indicates a pipe leading from hydraulic main of bench G to pipe $d^1$. $b^1$ indicates a pipe leading from hydraulic main I to pipe $d^1$. $c^1$ indicates a pipe leading from hydraulic main J to pipe $d^1$. $d^1$ indicates a pipe leading to condensing and purifying apparatus L. L indicates condensing, purifying, and measuring apparatus as in Fig. 1 United States Patent No. 179,475. $e^1$ indicates a pipe leading from L to gas-holders $H^2$ $H^3$ $H^4$ $H^5$. $H^2$ $H^3$ $H^4$ $H^5$ indicate gas-holders. $l^1$ indicates outlet-pipes from the several gas-holders. $q^1$ indicates a pipe leading from the outlet-pipes of the gas-holders to the small receiver M. $k^1$ indicates pipes connecting $a^1$ $b^1$ $c^1$ with $q^1$. N indicates the gas pump and regulator as in Figs. 2, 3, and 5, United States Patent No. 179,475. $t$ indicates an outlet-pipe from N, leading to O. O indicates the air-receiver, as $R^2$ in Fig. 2 United States Patent 179,475. M indicates a small gas holder or receiver. $s^2$ indicates an outlet-pipe from M, leading to pump N. $r^1$ indicates a pipe leading from $q^1$ to $s^2$. $u'$ indicates a pipe leading from the outlet of pump N to outlet of receiver O.

Fig. 2, Plate 1, represents a portion of an apparatus for manufacturing gas under high pressure for delivery to furnaces, &c. V indicates a cupola or upright furnace or retort filled with incandescent material, and heated from within. Y indicates a pipe or flue for the admission of atmospheric air. $c^5$ indicates a valve on Y. X indicates a pipe or flue to carry off the products of combustion. $a^5$ indicates chambers, with hand-hole covers to flue X. $d^5$ indicates a valve on X. $e^5$ indicates a valve on pipe $n$, for the admission of superheated steam and hydrocarbon vapors. Z indicates an outlet-pipe from V, leading to supplementary retort W. $h^5$ indicates a valve on Z. $Z^2$ indicates a pipe leading from Z to $Z^1$. $l^5$ indicates a valve on $Z^2$. $k^4$ indicates a safety-valve on V. $d^2$ indicates fire-bars. $a^2$ indicates a hand-hole to ash-pit. $o^5$ indicates a pressure-gage on Z. W indicates the supplementary retort. $Y'$ indicates a pipe for the admission of atmospheric air to W. $X^1$ indicates an outlet pipe or flue from W, to carry off the products of combustion. $g^5$ indicates a valve on $X^1$. $b^5$ indicates chambers and hand-hole covers to $X^1$. $Z^1$ indicates an outlet-pipe from V and W, leading to furnaces, forges, &c., to supply the gases under pressure without the intervention of a pump or forcing apparatus. $k^5$ indicates a valve on $Z^1$. $h^2$ indicates a pyrometer on $Z^1$. $d^4$ indicates a pressure-gage on $Z^1$. $l^4$ indicates a safety-valve on W. $p^5$ indicates a pipe for the admission of superheated steam to W. $q^5$ indicates a valve on $p^5$. $e^2$ indicates grate-bars. $b^2$ indicates hand-hole to ash-pit. $m'$ indicates a pipe leading from $Z^1$ to the condensing, purifying, and measuring apparatus. $O'$ indicates the condensing, purifying, and measuring apparatus. $n'$ indicates a pipe leading from $O'$ to $Z'$. $s^5$ indicates a valve on $Z^1$, between the pipes $m'$ and $n'$. $k^2$ indicates a pipe with valve, leading from $Z^1$ to a storage-holder, as at $H^2$, Fig. 1. $X^2$ indicates a blower or force-pump. $f^3$ indicates a pipe leading from $X^2$ to the flue X, for the purpose of increasing the draft in V. $g^2$ indicates a pipe leading from $X^2$ to the flue $X^1$, for the purpose of increasing the draft in W. $p^4$ indicates a pipe for the admission of superheated steam and hydrocarbon vapors from a vaporizer. $q^4$ indicates a valve on $p^4$.

Fig. 3, Plate 1, represents several kinds of apparatus for the application of gases and vapors produced by means of the apparatus described in Figs. 1 and 2, and in United States Patent No. 179,475, to the treatment of minerals, ores, and metals. All pipes have valves attached. $v^1$ indicates the outlet-pipe from O, Fig. 1, leading to the furnaces, forges, &c., and connecting with $Z^1$ the outlet-pipe from the retort in Fig. 2. P indicates a reheating-furnace. $x'$ indicates pipes leading to tuyeres in bottom of reheating-furnace. $w'$ indicates pipes leading to furnace, to supply gas for combustion. Q indicates a reverberatory, welding, reheating, or puddling furnace. $y^1$ indicates branch pipes to tuyeres, entering sidewise to furnace Q. $z^1$ indicates branch pipes to tuyeres, entering in an upward direction to furnace Q. $y^2$ indicates branch pipe to tuyeres at top of furnace Q. $y^3$ indicates tuyeres entering furnace Q through the top in an inclined direction. $y^4$ indicates a branch pipe leading into the furnace Q from $y^2$, to supply gases or vapors for combustion to heat the furnace. R indicates a furnace containing closed vessels or retorts for the heating of minerals, ores, and metals, free from contact with atmospheric air. T indicates closed vessels, boxes, or retorts in furnace R. $z^2$ indicates a branch pipe leading into T, for the admission of hydrogen or other gases. $z^5$ indicates a branch pipe from $z^2$, to heat furnace R. U indicates a cupola or blast furnace. $Z^3$ indicates tuyeres to U, which are supplied with gases under pressure through the pipe $Z^1$ direct from the retorts V and W without the intervention of a gas-holder, or pump, or forcing apparatus.

Plate 2 represents retorts for the treatment of carbonic-oxide gas to convert it into carbonic-acid gas, to purify the hydrogen gas.

Figure 1 represents a retort for the manufacture of hydrogen gas. Fig. 2 is a section through $x\ x$ in Fig. 1, and is a front view of retort A and chamber B. Fig. 3 is a section through $y\ y$ in Fig. 1, and is a view of the rear end of chamber B, showing the opening $b$, and passage-way $c$. Fig. 4 represents a plan of the chamber B.

Similar letters refer to similar parts.

A indicates the chamber for the manufacture of hydrogen and carbonic-oxide gases. B indicates the chamber through which the hydrogen and carbonic-oxide gases pass on their way from A, and in which the carbonic oxide is treated with superheated steam. $b$ indicates the opening in the back and at the bottom of B, for the passage of the hydrogen and carbonic-oxide gases from A to B. $c$ indicates the pipe or passage-way for the admission of superheated steam into B.

Fig. 5 represents a retort for the manufacture of hydrogen gas. Fig. 6 represents a front view of the above retort. Fig. 7 represents a section through $z\ z$ of E in Fig. 5, and shows the openings $f$ for the passage of the hydrogen and carbonic-oxide gases from D to E.

D indicates the chamber for the manufacture of hydrogen and carbonic-oxide gases. E indicates the chamber through which the hydrogen and carbonic-oxide gases pass on their way from D, and in which the carbonic-oxide gas is treated with superheated steam. $f$ indicates the openings on the sides and at the rear end and bottom of E, for the passage of the gases from D to E. $e$ indicates the pipe or passage-way for the admission of superheated steam into E.

I do not here limit or restrict myself to the forms of apparatus herein designated, or now in use for the treatment of mineral, ores, and metals, and manufactures of metals, suitable and specific forms of apparatus forming subjects of further applications for patents therefor.

I do not here claim the application of the agents and apparatus herein employed by me to the forging and welding of metals, they having been claimed for such purpose in my application for a patent filed August 21, 1876.

I do not here, broadly, claim the manufacture of hydrogen and other gases under pressure, nor the process of commingling superheated steam with hydrogen and carbonic-oxide gases to diminish the proportion of carbonic oxide in the manner herein described, they being the subject-matter of another application for a patent for improvements in process and apparatus for said manufacture; but What I do claim, and desire to secure by Letters Patent, is—

1. In the reduction of ores and treatment of molten metals, the direct application, substantially as described, of hydrogen gas, superheated steam, carbonic-oxide gas, carbonic-acid gas, atmospheric air, either hot or cold, the hydrogen being in excess, and carbureted-hydrogen gas and hydrocarbon vapors, substantially in the manner as herein described, and for the purpose set forth.

2. In the treatment of metals and manufactures of metals, the direct application, substantially as described, of hydrogen gas, superheated steam, carbonic-oxide gas, carbonic-acid gas, atmospheric air, either hot or cold, the hydrogen being in excess, and carbureted-hydrogen gas and hydrocarbon vapors, either with or without a solid, liquid, vaporized, or gaseous carbonaceous fuel, substantially in the manner as herein described, and for the purpose set forth.

3. In the production of metallic sponge and its conversion into wrought-iron, steel, homogeneous iron, and cast-iron, the direct application of hydrogen gas, superheated steam, carbonic-oxide gas, carbonic-acid gas, atmospheric air, either hot or cold, the hydrogen being in excess, and carbureted-hydrogen gas and hydrocarbon vapors, either with or without a solid, liquid, vaporized, or gaseous carbonaceous fuel, substantially in the manner as herein described, and for the purpose set forth.

4. The treatment of iron in heated retorts by means of superheated steam and hydrocarbon vapor, during the process of manufacturing heating and illuminating gases by the decomposition of the said steam and vapor, substantially as set forth.

5. The direct application of hydrocarbon vapors, carbureted-hydrogen gas, and carbonic-oxide gas, in a closed vessel, box, or retort, heated in a furnace, and from which atmospheric air is excluded, to iron, for its conversion into homogeneous iron, steel, malleable cast-iron, or cast-iron, substantially in the manner as herein described, and for the purpose set forth.

6. In combination with and as a part of the described process for the treatment of minerals, ores, and metals, and manufactures of metals, the passing, in a downward direction, of superheated steam or commingled superheated steam and hydrocarbon vapor, through incandescent mineral or metallic substances, heated in a vertical vessel or retort, made steam-tight and of sufficient strength to resist a high pressure, the said superheated steam or combined superheated steam and hydrocarbon vapors being decomposed in their said passage, and the direct delivery of the resultant hydrogen and other gases from the manufacturing apparatus, with the pressure of the boiler in which the steam is generated, to the blast, reverberatory, annealing, and the other furnaces and apparatus, without the intervention of gas-holders or pumping apparatus, substantially in the manner as herein described, and for the purpose set forth.

7. In combination with and as a part of the described process of treating minerals, ores, and metals, and manufactures of metals, the commingling superheated steam with hydrogen and carbonic-oxide gases in a retort or in a conducting-chamber in and leading from a retort, the said retort or chamber containing incandescent mineral or metallic substances, for the purpose of converting the carbonic-oxide into carbonic-acid gas, and diminishing the proportion of the carbonic-oxide gas in the hydrogen gas, substantially in the manner as herein described, and for the purpose set forth.

8. In an apparatus for the treatment of minerals, ores, and metals, and manufactures of metals, a steam-generator, a hydrocarbon-vaporizer, and connected therewith a vessel or retort for converting the steam and hydrocarbon into gas, and a retort or conducting-chamber for the treatment of carbonic-oxide gas, and a pipe or pipes leading from said retorts to the cupola and other furnaces and vessels for the treatment of minerals, ores, and metals, and manufactures of metals, said apparatus being made steam-tight, and constructed, as described, so that the pressure from the steam-generator shall be transmitted to the gas in the converting-vessel or retort, and force it through the said pipes to the furnaces and vessels aforesaid, substantially in the manner as herein described, and for the purpose set forth.

9. In an apparatus for the treatment of minerals, ores, and metals, and manufactures of metals, the combination of a boiler, B, Plate 1, a superheater, S, a hydrocarbon-vaporizer, E F, a retort-bench, as at G, containing retorts and vaporizers for the manufacture of heating and illuminating gases, a retort-bench, H, containing superheaters, as at $S^1$ $S^2$ $S^3$, a retort or retorts, $H^1$, for the manufacture of hydrogen gas, a retort, C, for the manufacture of carbonic-acid and other gases, hydraulic mains I and J, condensing, purifying, and measuring apparatus, as at L, gas-holders, as at $H^2$ $H^3$ $H^4$ $H^5$, small receiving-holder M, force-pump and regulator, as at N, an air or gas receiver, as at O, vertical vessels or retorts V and W, blower $X^2$, condensing and purifying apparatus, as at O', retorts and conducting-chambers A and B, D and E, in Plate 2, a reheating-furnace, P, Plate 1, a reverberatory furnace, Q, with tuyeres, a reheating or annealing furnace, R, containing a vessel or retort, T, with connecting-pipes, a cupola or blast-furnace, U, with tuyeres, the whole being connected with suitable pipes and valves, substantially as set forth.

In testimony that I claim the foregoing as my own I affix my signature in the presence of two witnesses.

JOSEPH PEARSON GILL.

Witnesses:
WM. H. GRENELLE,
CHAS. G. HANKS.